United States Patent Office 3,366,536
Patented Jan. 30, 1968

3,366,536
ORGANOPHOSPHORUS INSECTICIDAL
COMPOSITIONS AND METHODS
John H. Wilson, Jr., Richmond, Va., assignor to Mobil Oil
Corporation, a corporation of New York
No Drawing. Filed Sept. 16, 1963, Ser. No. 309,335
18 Claims. (Cl. 167—22)

ABSTRACT OF THE DISCLOSURE

A method is provided for the control of insects with various phosphorus-containing compounds, namely thiopyrophosphonates. Compositions of said compounds with insecticidal carriers are also provided.

---

This invention relates to methods for the control of insects. More particularly, the invention relates to the control of insects with compounds of the formula $$\begin{array}{c} R \\ R'S \end{array}\!\!>\!\!\overset{X}{\underset{\|}{P}}\!XM$$

wherein R and R' are alkyls of from 1 to 4 carbon atoms, X is one of the group consisting of oxygen and sulfur and M is one of the group consisting of $$-\overset{X}{\underset{\|}{P}}\!\!<\!\!\begin{array}{c} R \\ SR' \end{array} \quad \text{and} \quad -\overset{X}{\underset{\|}{P}}(OR'')_2$$

wherein R, R' and X are the same as defined above and R'' is an alkyl of from 1 to 8 carbon atoms.

As is evident from the above general formula, insects are to be controlled by using compounds represented by the following formulae:

(1)
$$\begin{array}{c} R \\ R'S \end{array}\!\!>\!\!\overset{X}{\underset{\|}{P}}\!X\overset{X}{\underset{\|}{P}}\!\!<\!\!\begin{array}{c} R \\ SR' \end{array}$$

(2)
$$\begin{array}{c} R \\ R'S \end{array}\!\!>\!\!\overset{X}{\underset{\|}{P}}\!X\overset{X}{\underset{\|}{P}}\!\!<\!\!\begin{array}{c} OR'' \\ OR'' \end{array}$$

wherein R, R', R'' and X have the some meanings as defined above.

Those compounds of this invention which are exemplified by Formula 1 may be prepared essentially as follows:

$$2\begin{array}{c} R \\ R'S \end{array}\!\!>\!\!PCl + HXH \longrightarrow \begin{array}{c} R \\ R'S \end{array}\!\!>\!\!PXP\!\!<\!\!\begin{array}{c} R \\ SR' \end{array} + 2HCl$$

General methods for preparing these compounds are well known. See, for example, Kosolapoff, Organophosphorus Compounds, Sec. XIV, page 343 (1958). When compounds having an oxygen bridge between the two phosphorus atoms are desired, they may be obtained by reacting substantially two moles of an S-alkyl alkylphosphonohalido-thioate or an S-alkyl alkylphosphonohalidodithioate, wherein the alkyl has from 1 to 4 carbon atoms, with substantially one mole of water, using two moles of an organic amine, such as pyridine or triethylamine, or other base, as the acid acceptor. Solvents are not essential, but they are desirable as a means of dissipating heat and preventing the solid produced from interfering with stirring efficiency.

Compounds having sulfur as a bridge between the two phosphorus atoms are obtained in a similar manner by substituting hydrogen sulfide for water.

The following specific examples will illustrate the preparation of compounds of Formula 1. "Parts" are parts by weight.

Example 1

O-(S-propyl methylphosphonothioyl) S-propyl methylphosphonodithioate $$2CH_3(C_3H_7S)\overset{S}{\underset{\|}{P}}Cl + HOH + 2C_5H_5N \longrightarrow$$
$$CH_3(C_3H_7S)\overset{S}{\underset{\|}{P}}O\overset{S}{\underset{\|}{P}}(SC_3H_7)CH_3 + 2C_5H_5N\cdot HCl$$

Eighteen and nine-tenths parts of S-propyl methylphosphonochloridodithioate and about 70 parts of hexane were placed in a suitable reaction vessel. A mixture of 0.9 part of water and 7.9 parts of pyridine was added, with stirring, to the solution in the reaction vessel. The addition required 10 minutes at 25° C. There was a slight rise in temperature, but not enough to indicate any appreciable reaction. The reaction mixture was brought to reflux temperature (68° C.), and was held there for 2 hours. The contents of the vessel were cooled, the pyridine hydrochloride was removed, and the solvent was distilled to a final pot temperature of 60° C. and a final pressure of 40 mm. of Hg. Distillation gave 67.3% of the product boiling at 142–150° C. at 0.2 mm. of Hg.

Example 2

S-(S-propyl methylphosphonothioyl) S-propyl methylphosphonotrithioate $$2CH_3(C_3H_7S)\overset{S}{\underset{\|}{P}}Cl + HSH + 2(C_2H_5)_3N \longrightarrow$$
$$CH_3(C_3H_7S)\overset{S}{\underset{\|}{P}}S\overset{S}{\underset{\|}{P}}(SC_3H_7)CH_3 + 2(C_2H_5)_3N\cdot HCl$$

Eighteen and nine-tenths parts of S-propyl methylphosphonochloridodithioate, 10.1 parts of triethylamine and about 70 parts of hexane were placed in a reaction vessel having, in addition to the usual stirring and temperature measuring means, a gas addition tube attached in such a manner that gas could be fed in beneath the surface of the liquid. The mixture was heated to reflux, and, while stirring vigorously, hydrogen sulfide was bubbled in. Refluxing and addition of the hydrogen sulfide was continued for 4 hours. The resulting mixture was filtered to remove the triethylamine hydrochloride and was distilled to a pot temperature of 60° C. and a final pressure of 30 mm. of Hg to remove the solvent. 28.6 parts of product was obtained.

The compounds designated by Formula 2 may be obtained by reacting a compound of the formula $$Cl\overset{X}{\underset{\|}{P}}(SR')R$$

with a compound of the formula $$(R''O)_2\overset{X}{\underset{\|}{P}}XH$$

in the presence of an organic amine free of active hydrogen, substantially according to the following scheme:

$$R(R'S)\overset{X}{\underset{\|}{P}}Cl + (R''O)_2\overset{X}{\underset{\|}{P}}XH + \text{amine} \longrightarrow$$
$$R(R'S)\overset{X}{\underset{\|}{P}}X\overset{X}{\underset{\|}{P}}(OR'')_2 + \text{amine}\cdot HCl$$

R, R', R'' and X have the same meanings as above.

The compounds may be prepared also by using a salt of the appropriate acid. Various salt forming ions, such as sodium, potassium, lithium or ammonium may be used.

Just as in the case involving compounds of Formula 1, solvents are not generally essential, though they are desirable. When solvents are used, any inert member will be suitable provided the starting materials and product are substantially soluble therein, and provided further that its boiling point is not sufficiently high to prevent easy separation of the product therefrom.

*Example 3*

This example will illustrate the preparation of a compound represented by Formula 2.

S-(O,O-diethyl phosphorothioyl) S-propyl methylphosphonotrithioate

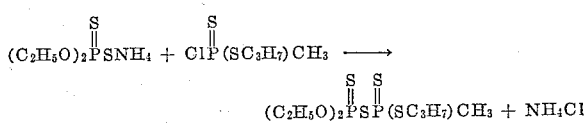

$$(C_2H_5O)_2\overset{S}{\overset{\|}{P}}SNH_4 + Cl\overset{S}{\overset{\|}{P}}(SC_3H_7)CH_3 \longrightarrow$$
$$(C_2H_5O)_2\overset{S}{\overset{\|}{P}}S\overset{S}{\overset{\|}{P}}(SC_3H_7)CH_3 + NH_4Cl$$

Ten and two-tenths parts of ammonium O,O-diethyl phosphorodithioate and 59 parts of acetone were placed in a suitable reaction vessel. 9.4 parts of S-propyl methylphosphonochloridodithioate was added to this at room temperature. No reaction occurred. The mixture was thereupon heated to the refluxing temperature of the solvent, and was maintained there, while stirring, for four hours. The mixture was cooled, the ammonium chloride was removed by filtration, and the acetone was distilled away from the product in vacuo. The product was obtained in essentially theoretical yield.

The compounds of the present invention are insecticides (which term shall be understood to encompass spiders, mites, ticks and similar pests which are not, biologically speaking, insects) within the range of about 0.01% to about 1% of the total weight of formulation used. It is, however, contemplated that under certain conditions the amount may be less than the lowest stated rate. Furthermore, while 1% will generally be adequate for complete control, adverse weather, pest resistance and the like may require a higher rate. The stated range, therefore, is merely a statement of the preferred amount.

The compounds may be used as the sole agent in insecticidal formulations, or they may be used in conjunction with other toxicants. They may be made into insecticidal compositions by diluting with solid carriers such as fertilizers, talc, bentonite, attapulgite and the like, by dispersing in an inert organic solvent, or in water, or in a combination of water and solvent. Other solid carriers are well-known and will be obvious to those in this art. The inert organic solvent used is preferably one which will evaporate quickly from the treated plants or if not volatile, will not be phytotoxic to the plant. Aqueous dispersions may contain a surface active agent such as Tween 20 (poly oxyethylene sorbitan monolaurate), which will aid in emulsification and in spreading the active material more uniformly over the plant surface.

In using the chemicals of this invention against agricultural pests, the aqueous dispersion or solution will ordinarily be made up from a concentrate composed substantially of the compound and at least about 1%, based upon the weight of the active ingredient, of a surface active agent. The concentrate will be dispersed or dissolved in water, or in water containing an inert organic solvent, to the extent necessary to give the desired concentration of active ingredient.

When preparing a dust or granular formulation, a more even distribution of chemical can be obtained if it is dissolved in a volatile solvent prior to mixing. After mixing, the solvent is evaporated by any conventional method. Any inert solvent in which the active ingredient is soluble and which may be readily removed by evaporation is acceptable.

When treating for insects it is necessary only to apply sufficient of the material to assure contact with the pests. For example, when treating the surfaces of plants infested with insects, control can be achieved by dusting in the same manner as with agents such as DDT, or by spraying a liquid formulation just to the point of run-off.

When the insect is soil-borne, the solution, dispersion, or solid formulation may be distributed evenly over the area to be treated in any convenient manner. Where the formulation is liquid, the active component may be washed in by spraying water over the area, or it may be left to the natural action of rainfall. The solid formulations, after distribution, may be mixed with the soil by plowing, disking, etc. Liquid formulations may be plowed or disked into the soil also. In any event, for the control of most soil-borne insects, the active ingredient will ordinarily have to be dispersed down to a depth of at least eight inches.

*Example 4*

This example illustrates the activity of the above-disclosed chemicals as insecticides.

Three grams of whole wheat flour was placed in each of several 20 x 90 mm. petri dishes. One ml. of acetone containing the active component was poured on the flour in each dish and was thoroughly mixed therewith. After ample time for complete evaporation of the acetone (about 2 hours), the flour was removed to one side so it covered about one-half of the dish. Adult confused flour beetles, *Tribolium confusum*, were placed in the flour, and the dish and flour were covered with cheese cloth. The tests were run in triplicate at each concentration, and the results were taken after 48 hours. The results in the following table are averages of the replicate tests.

TABLE 1

| Compound | Rate, mg. | Percent Kill |
|---|---|---|
| Example 1 | 4 | 100 |
|  | 2 | 99 |
| Example 2 | 8 | 100 |
|  | 4 | 84 |
| Example 3 | 4 | 48 |

Other compounds which may be prepared by the methods outlined above and which are within the scope of the present invention are as follows:

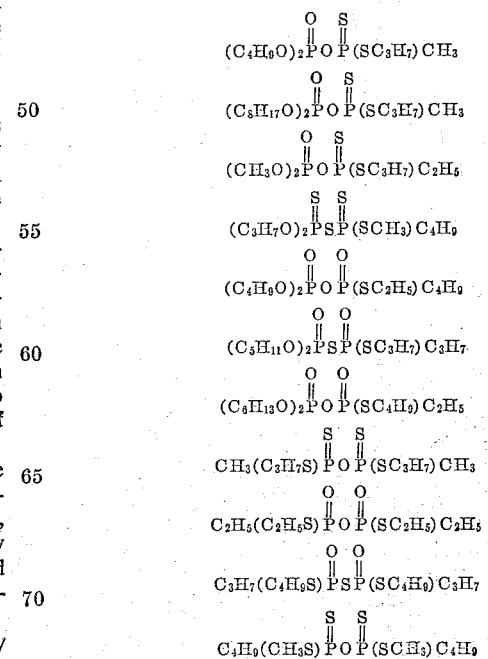

What is claimed is:
1. A method for controlling insects which comprises applying thereto an insecticidal amount of a compound of the formula

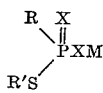

wherein R and R' are alkyl of one to four carbon atoms, X is a member of the group consisting of oxygen and sulfur and M is a member of the group consisting of

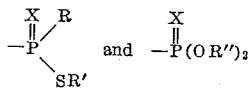

wherein R, R' and X are as hereinbefore defined and R'' is an alkyl of one to eight carbon atoms.

2. A method for controlling insects which comprises applying thereto an insecticidal amount of a compound of the formula

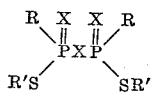

wherein R and R' are alkyl of one to four carbon atoms and X is a member of the group consisting of oxygen and sulfur.

3. The method of claim 2 wherein the compound is

4. The method of claim 2 wherein the compound is

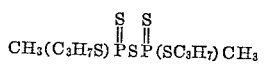

5. A method for controlling insects which comprises applying thereto an insecticidal amount of a compound of the formula

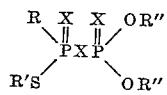

wherein R and R' are alkyl of one to four carbon atoms, X is a member of the group consisting of oxygen and sulfur, and R'' is an alkyl of one to eight carbon atoms.

6. The method of claim 5 wherein the compound is

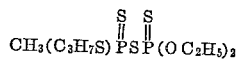

7. An insecticidal composition comprising an insecticidal amount of a compound of the formula

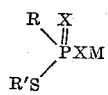

wherein R and R' are alkyl of one to four carbon atoms, X is a member of the group consisting of oxygen and sulfur and M is a member of the group consisting of

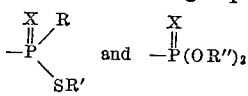

wherein R, R' and X are as hereinbefore defined and R'' is alkyl of from one to eight carbon atoms, and an insecticidal carrier therefor.

8. An insecticidal composition comprising an insecticidal amount of a compound of the formula

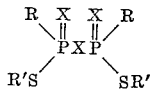

wherein R and R' are alkyl of one to four carbon atoms and X is a member of the group consisting of oxygen and sulfur, and an insecticidal carrier therefor.

9. The composition of claim 8 wherein the carrier is a liquid carrier.

10. The composition of claim 8 wherein the carrier is a solid carrier.

11. The composition of claim 9 wherein the liquid carrier additionally contains a surface active agent.

12. The composition of claim 8 wherein the compound is

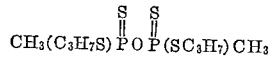

13. The composition of claim 8 wherein the compound is

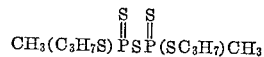

14. An insecticidal composition comprising an insecticidal amount of a compound of the formula

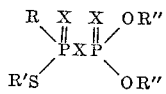

wherein R and R' are alkyl of one to four carbon atoms, X is a member of the group consisting of oxygen and sulfur, and R'' is alkyl of one to eight carbon atoms, and an insecticidal carrier therefor.

15. The composition of claim 14 wherein the carrier is a liquid carrier.

16. The composition of claim 14 wherein the carrier is a solid carrier.

17. The composition of claim 15 wherein the liquid additionally contains a surface active agent.

18. The composition of claim 14 wherein the compound is

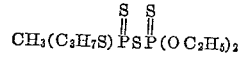

References Cited

UNITED STATES PATENTS 3,052,596    9/1962    Baker _____ 167—22
3,188,339    6/1965    Maier _____ 167—22
3,280,224    10/1966    Melton _____ 167—22

ALBERT T. MEYERS, Primary Examiner.

S. FRIEDMAN, Assistant Examiner.